Patented June 11, 1940

2,203,923

UNITED STATES PATENT OFFICE 2,203,923

PREPARATION OF SALTS OF 2-KETO-ALDONIC ACIDS

Richard Pasternack, Brooklyn, N. Y., and Peter P. Regna, North Bergen, N. J., assignors to Charles Pfizer & Company, Brooklyn, N. Y., a corporation of New Jersey No Drawing. Application August 5, 1939, Serial No. 288,571

7 Claims. (Cl. 260—535)

The object of this invention is the preparation of salts of 2-keto-aldonic acids by a simplified process giving improved yields. It is a continuation-in-part of our copending application Serial No. 247,644, filed December 24, 1938 which has matured into Patent Number 2,188,777.

In said earlier application it is disclosed that aldonic acids and salts of aldonic acids may be oxidized by chlorates in the presence of vanadium catalysts in acidified aqueous media. We have now found that a considerable improvement in yield and a simpler recovery of the product is possible by the addition of a water-miscible organic solvent which is substantially inert to the oxidizing action of chlorates in the presence of vanadium catalysts. We prefer to use methyl alcohol in such quantity as to form an aqueous solution containing 50–70% by volume of the methanol. From such a solution a substantial proportion of the dehydrogenated product is directly precipitated during the reaction. The medium should be slightly acid; phosphoric acid or acetic acid are suitable acidifying agents. The vanadium catalyst may be added in solid form or may be previously dissolved in alkali or acid. Its state of oxidation is of no importance, since in any case it is oxidized to the pentavalent state by the chlorate.

Example 1.—The dehydrogenation of sodium $l$-idonate to sodium 2-keto-$l$-idonate. To a solution of 21.8 g. of sodium $l$-idonate in 45 ml. of water, 3.6 g. of sodium chlorate and 2 ml. 85% phosphoric acid were added. The mixed solution was slightly warmed and diluted with 120 ml. methyl alcohol. After the further addition of 2 g. of vanadium pentoxide, the cooled mixture was shaken for 3 to 4 days at room temperature.

As the oxidation proceeded, substantial amounts of sodium 2-keto-idonate crystallized out, since in aqueous alcohol the sodium salt of the 2-keto-idonate is less soluble than sodium idonate. The end of the reaction is readily recognized by a color change of the solution from yellow to green.

The vanadium catalyst was removed by the following procedure: Sufficient water was added to redissolve the precipitated sodium 2-keto-idonate and the mixture filtered to remove the insoluble portion of the catalyst. The filtrate was then freed of alcohol by distillation under reduced pressure. The remaining aqueous solution was treated with sufficient calcium ferrocyanide to precipitate the vanadyl ion and filtered. The calcium remaining in solution was removed by treatment with oxalic acid and subsequent filtration.

To determine the amount of 2-keto-acid produced, an aliquot portion of the clear filtrate was analyzed by the usual Fehling's reduction method. The indicated yield of 2-keto-$l$-idonic acid was 85%.

The main portion of the reaction mixture, after concentration under diminished pressure to about 50 ml., was warmed and treated with methyl alcohol to adjust to a concentration of 70% alcohol by volume. From this aqueous alcoholic mixture sodium 2-keto-$l$-idonate monohydrate readily crystallized. After separation by filtration, washing with 70% methyl alcohol and drying, it had a melting point of 144–145° C. and rotation $$(\alpha)_D^{20} = -23.6° \ (c, 10)$$

which constants agree well with the values given by Micheel, Kraft and Lohmann (Z. Physiol. Chem. 225: 13–27, 1934).

Example 2.—Preparation of the methyl ester of 2-keto-gluconic acid from ammonium gluconate. A solution containing 21.3 g. of ammonium d-gluconate in 100 ml. water was treated with 3.6 g. of sodium chlorate, 2 ml. of 85% phosphoric acid and 100 ml. methyl alcohol with slight warming. Two grams of vanadium pentoxide was added to the cooled clear solution, and this mixture was then shaken for about twenty-four hours, when the change to a blue color showed the presence of the vanadyl ion. The precipitate, consisting of 2-keto-gluconate and catalyst, was filtered out and treated with water. The insoluble catalyst was removed and the filtrate combined with the main solution. This soluble vanadyl ion was removed with calcium ferrocyanide, and the calcium ion with oxalic acid. An analysis by Fehling's reduction on an aliquot portion showed a 72% yield calculated as ammonium 2-keto-gluconate.

This salt can be isolated by fractional crystallization or recovered as the methyl ester in the following manner: The reaction mixture is treated with the calculated amount of sulfuric acid to combine with the ammonium salts to form ammonium sulfate. The solution is evaporated to dryness and the residue taken up with methyl alcohol. The inorganic salts are removed by filtration, and the filtrate treated with hydrochloric acid gas until it contains 1% hydrochloric acid. Upon inoculating the solution with crystals of 2-keto-d-gluconic methyl ester, the ester crystallizes on standing. The melting point 173–175° C. and rotation $$(\alpha)_D^{20} = -76.8°$$

in water, at equilibrium (c, 2.8), agree with the values given by Ohle (Ber. 63: 849, 1930).

Our process is applicable to the aldonates in general, subject only to the limitation that the salt selected for dehydrogenation must be to some extent soluble in the particular concentration of organic solvent present. Thus in the case of the gluconates for example, it is preferable to use their alkali metal salts rather than their alkaline earth metal salts.

The invention claimed is:

1. Process which comprises treating a soluble aldonate with a member of the group consisting of alkali metal and alkaline earth metal chlorates in the presence of a vanadium catalyst and in a mildly acid aqueous solution comprising essentially a lower aliphatic alcohol.

2. Process for preparing 2-keto-aldonates which comprises reacting sodium chlorate upon a soluble aldonate in the presence of a vanadium catalyst and in a mildly acid aqueous solution comprising essentially a lower aliphatic alcohol.

3. Process which comprises treating a soluble aldonate with sodium chlorate in the presence of a vanadium catalyst and in a mildly acid aqueous solution comprising essentially methyl alcohol.

4. Process for preparing 2-keto-aldonates which comprises reacting sodium chlorate upon a soluble aldonate in the presence of a vanadium catalyst and in a mildly acid aqueous solution comprising essentially methyl alcohol.

5. Process for preparing sodium 2-keto-$l$-idonate which comprises reacting sodium chlorate upon sodium $l$-idonate in the presence of a vanadium catalyst and in a mildly acid aqueous solution comprising essentially methyl alcohol.

6. Process for preparing ammonium 2-ketogluconate which comprises reacting sodium chlorate upon ammonium gluconate in the presence of a vanadium catalyst and in a mildly acid aqueous solution comprising essentially methyl alcohol.

7. Process which comprises treating a soluble aldonate with sodium chlorate in the presence of a vanadium catalyst and in a mildly acid aqueous solution comprising essentially methyl alcohol from which a substantial proportion of the resulting 2-keto aldonate crystallizes during the reaction, and continuing until the solution changes in color from yellow to green.

RICHARD PASTERNACK.
PETER P. REGNA.